United States Patent [19]

Kobayashi

[11] Patent Number: 4,833,528
[45] Date of Patent: May 23, 1989

[54] COLOR VIDEO PROJECTING APPARATUS USING ACOUSTO-OPTICAL DEFLECTOR

[75] Inventor: Koji Kobayashi, Hino, Japan

[73] Assignee: Kowa Company Ltd., Japan

[21] Appl. No.: 253,374

[22] Filed: Sep. 30, 1988

Related U.S. Application Data

[63] Continuation-in-part of Ser. No. 35,090, Apr. 6, 1987, abandoned.

[30] Foreign Application Priority Data

Apr. 9, 1986 [JP] Japan .................................. 61-80237

[51] Int. Cl.$^4$ .............................................. H04N 9/10
[52] U.S. Cl. ...................................... 358/53; 358/63; 358/60
[58] Field of Search ....................... 358/53, 63, 61, 60, 358/56

[56] References Cited

U.S. PATENT DOCUMENTS

| 3,507,984 | 4/1970 | Stavis ..................................... 358/63 |
| 3,524,011 | 8/1970 | Korpel ................................... 358/60 |
| 3,549,800 | 12/1970 | Baker ................................... 358/63 X |
| 3,569,988 | 3/1971 | Schmidt et al. ................... 358/60 X |
| 3,713,721 | 1/1973 | Watson ................................ 358/61 X |
| 3,783,185 | 1/1974 | Spaulding ........................ 358/63 X |
| 3,818,129 | 6/1974 | Yamamoto ............................ 358/60 |
| 3,894,182 | 7/1975 | Yamamoto et al. ............. 358/63 X |
| 4,110,788 | 8/1978 | Merry ................................... 358/63 |
| 4,112,461 | 9/1978 | Owens ................................... 358/63 |
| 4,274,109 | 6/1981 | Whitby ................................. 358/53 |
| 4,562,461 | 12/1985 | Yin ...................................... 358/63 X |
| 4,714,956 | 12/1987 | Yin ......................................... 358/60 |
| 4,720,747 | 1/1988 | Crowley ........................... 358/60 X |

OTHER PUBLICATIONS

Article entitled "Bichromatic Nondispersive Acoustooptic Deflector" by M. G. Gazalet, C. Bruneel, R. Torquet, G. Thomin and B. Nongaillard, pp. 2192–2197.
Spaulding, "Three–Color Acoustooptic Modulator", Oct. 1974, p. 843.
Spaulding, "Three Color Modulation Divided by Three", 1974, pp. 36–40.
Baker, "Laser Display Technology", Dec. 1968, pp. 39–50.

Primary Examiner—James J. Groody
Assistant Examiner—E. Anne Faris
Attorney, Agent, or Firm—Bruce L. Adams; Van C. Wilks

[57] ABSTRACT

Disclosed is a laser beam scanning system which includes a plurality of laser sources each of which produces a laser beam having a different wavelength. The laser beam component is intensity-modulated with a corresponding color video signal and deflected by an acousto-optical deflector to scan a medium in at least one direction to produce a color image thereon. Because of the color dispersion inherent to the deflector, the angle of deflection is dependent on the wavelength of the laser beam component. To compensate for the color dispersion, a signal processor is provided to adjust the intensity modulation for the corresponding laser beam component in such a manner that each of the laser beam components is intensity-modulated differently from the others in terms of scanning time to obtain substantially the same angle of deflection for all the beam components.

20 Claims, 6 Drawing Sheets

PRIOR ART $\theta \cong \frac{\lambda f}{v}$ (rad)

FIG. 7

PRIOR ART

COLOR VIDEO PROJECTING APPARATUS USING ACOUSTO-OPTICAL DEFLECTOR

This is a continuation-in-part of Application Serial No. 035,090 filed Apr. 6, 1987 now aband.

BACKGROUND OF THE INVENTION

1. Field of the Invention

This invention relates to a laser beam scanning system, and more particularly to a laser beam scanning system for scanning a medium by using a plurality of laser beams, each having a different wavelength, the laser beams being intensity-modulated by a corresponding color video signal and deflected by a deflection means to scan the medium to produce a color image thereon.

2. Description of the Prior Art

Image output systems in which a spot of laser light that is intensity-modulated by video signals is used to scan a medium such as a screen or film to display or record an image thereon feature a number of advantages, such as the brightness and convergence of the laser beam and its coherence, and they are in wide use in industrial and medical fields.

Using the laser beam to scan two-dimensionally, horizontally and vertically, and having the scanning rate correspond to the raster scan of an ordinary TV system enables a real-time video image to be obtained which is free of residual image and as such has a broader range of use and markedly improved operability.

In such a system, methods for deflecting the laser beam to scan horizontally or vertically include mechanically driven methods that employ a swinging mirror or a polygonal mirror or other rotating multifaceted mirror, and non-mechanical methods using acousto-optical deflectors and the like.

However, in the case of ordinary raster scanning, with the NTSC system the horizontal scanning frequency is 15.75 KHz and the vertical scanning frequency is 60 Hz, while in the case of high-definition television the horizontal scanning frequency is even higher. As a result, using a mechanical drive for vertical deflection of the laser beam provides sufficient tracking and control stability, but there have been no low-cost, reliable mechanical control methods for providing the horizontal deflection because of the very high frequency that is involved.

Mechanical drive systems that employ swinging mirrors or rotating multifaceted mirrors do not cause color dispersion even when using a plurality of laser beams each having a different wavelength, and while high scanning frequencies of 10 KHz or more are possible there are problems relating to the durability of the working life of the mechanisms, while wobble of the mirror axis and the like make it difficult to produce a precise raster. On the other hand, because methods using acousto-optical deflectors have no mechanically controlled parts, they are very reliable, but involve the following problems.

Figure 6:
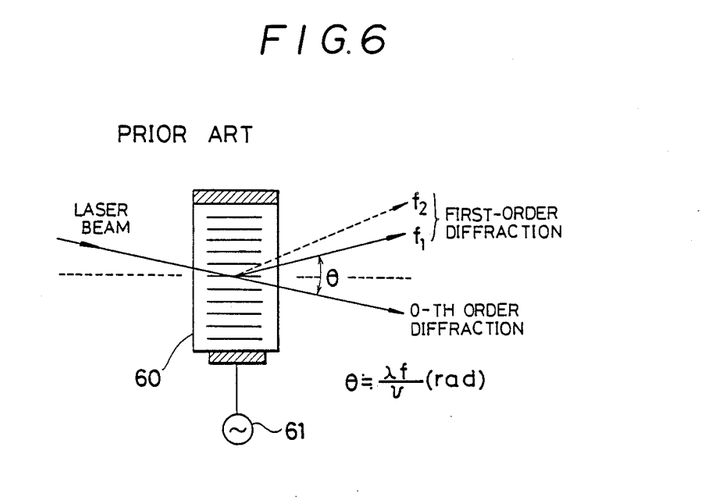
FIG. 6 is an explanatory diagram showing the operating principle of the acousto-optical deflector.

FIG. 6 shows the operation of an acousto-optical deflector 60; the acousto-optical deflector 60 is driven by a signal source 61. If the ultrasonic driving frequency is f, the wavelength of the incident laser beam is $\lambda$ and the ultrasonic velocity is v, the angle $\theta$ of the first-order diffraction obtained by the operation of the acousto-optical deflector is:

$$\theta \simeq \lambda f/v$$

Figure 7:
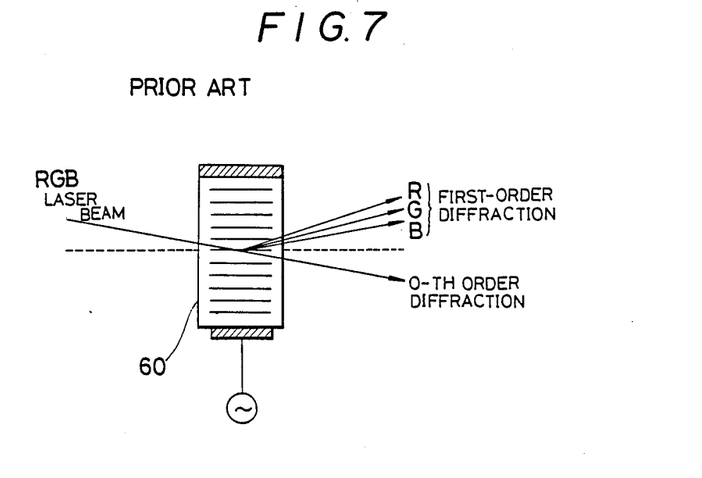
FIG. 7 is an explanatory diagram of the color dispersion produced by the acousto-optical deflector.

However, with such a deflection system, unlike a mechanically driven mirror type method, because the angle of diffraction is dependent on the wavelength of the incident beam, color dispersion occurs. For example, when the three-color R (red), G (green), B (blue) laser beams shown in FIG. 7 impinge on the acousto-optical deflector 60, the longer the wavelength, the larger the angle of diffraction becomes, so the color dispersion of the first-order diffraction is produced.

Therefore, when a laser source producing a plurality of laser beams is used to produce chromatic information a medium, there has been a drawback that the coloring of the images has been difficult.

In view of this problem, there are known techniques comprising the use of a plurality of acousto-optical deflectors for different laser beam wavelengths, and combining the beams following the deflection; or a single acousto-optical deflector is used to deflect a plurality of laser beams of different wavelengths, and the resultant color dispersion that is produced is corrected by means of optical elements such as mirrors and prisms. With either method the optical system becomes complex and costly, and it is also extremely difficult to construct a correcting optical system which is capable of perfectly combining a plurality of laser beams of different wavelengths over a wide range of deflection angles. In addition, the aforesaid type of correcting optical system is set for the wavelengths of the laser beams, making it difficult to readily adjust it should it become necessary to change to a laser source of a different wavelength.

In addition to acousto-optical deflectors, there have been developed non-mechanical laser-beam deflection devices which can provide high scanning frequencies, but most of these devices employ optical diffraction or refraction which in itself gives rise to color dispersion, so there are problems of resolution and reliability and few of the devices have been put to practical use.

Thus, a reliable laser beam scanning system that provides laser beam scanning compatible with ordinary TV raster scanning and can perform input processing of color images in real time has not yet appeared.

SUMMARY OF THE INVENTION

It is therefore an object of the present invention to provide a laser beam scanning system that is capable of producing a color image on a real-time basis.

It is another object of the present invention to provide a laser beam scanning system that is capable of producing a color image free from color dispersion.

According to the present invention, a laser beam scanning system comprises a laser source for producing a plurality of laser beams each having a different wavelength; a video signal source for producing color video signals the colors of which correspond to the respective wavelengths of the laser beams; a plurality of intensity modulators each receptive of one of the laser beams and one of the color video signals for intensity-modulating the corresponding laser beam with the video signal; a deflector for deflecting the intensity-modulated laser beams at an angle of scanning deflection which is dependent on the wavelength of the laser beam resulting in color dispersion of the deflector, the deflector being adapted to scan the medium in a given direction and produce the color image thereon; and a signal processor for adjusting the intensity modulation in such a manner that each of the laser beams is intensity-modulated differently in terms of scanning time from others to obtain substantially the same angle of deflection for all the color beams.

According to the preferred embodiment, the intensity modulation video signal for a laser beam which gives rise to less color dispersion is processed later in terms of scanning time than the intensity modulation video signal for a laser beam which gives rise to more color dispersion, more preferably so later that the angle of deflection of the laser beam of one color substantially coincides with the angle of deflection for the laser beam of the other color.

With such an arrangement, the intensity modulation is so adjusted, that each of the laser beams is intensity-modulated differently from others in terms of scanning time to obtain substantially the same angle of deflection for all the color beams. This enables the color dispersion produced by the deflection means to be removed completely.

BRIEF DESCRIPTION OF THE DRAWINGS

The object and features of the present invention will become more apparent from the following detailed description taken in conjunction with the accompanying drawings in which.

DETAILED DESCRIPTION OF THE PREFERRED EMBODIMENTS

Figure 1:
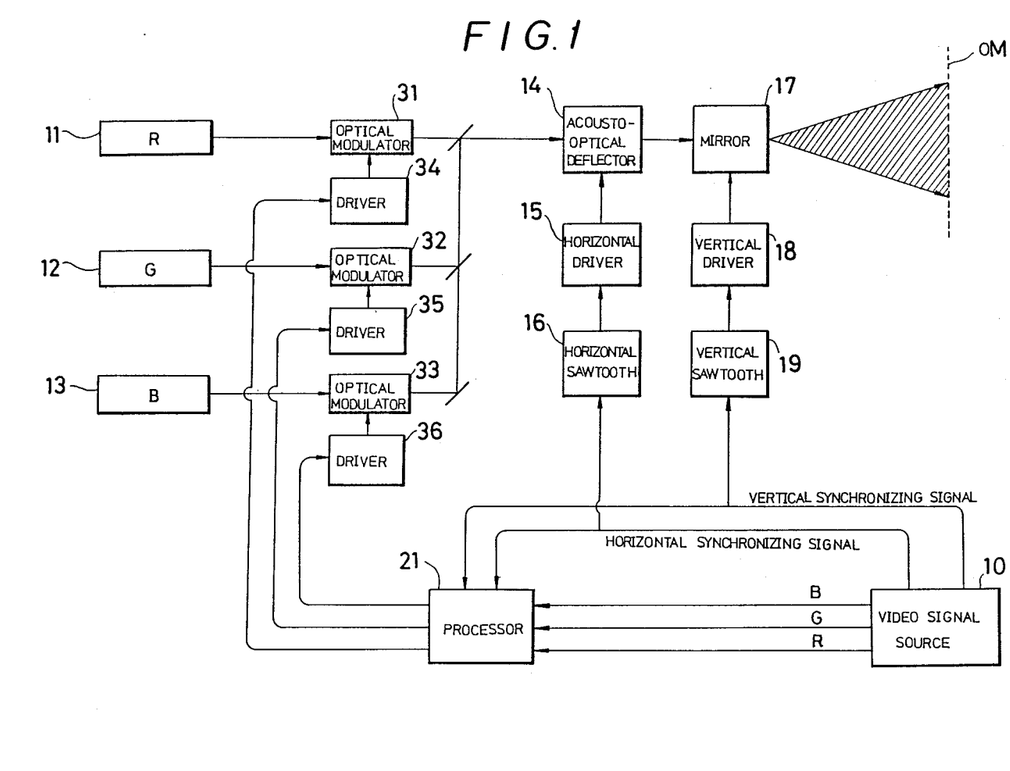
FIG. 1 is a block diagram showing the overall structure of a laser beam scanning system according to the present invention.

FIG. 1 is a block diagram showing the construction of a laser beam scanning system according to the present invention.

In this embodiment, to output the color images to the screen, film or other such media, there are provided three laser light sources 11, 12, and 13 for the three basic or primary colors Red (R), Green (G) and Blue (B) for obtaining color images. The R, G and B laser beam components output by the respective laser light sources 11, 12 and 13 are each intensity-modulated by optical modulators 31, 32 and 33 on the basis of RGB video signal components output from a video signal generator 10, and are then subjected to horizontal and vertical deflection and projected onto the medium OM. Details of the intensity-modulation arrangement are explained later. An acousto-optical deflector 14 is used to provide the deflection for the horizontal scanning. A mirror device 17 consisting of a swinging mirror or a polygonal mirror or the like is used for vertical deflection of the laser beam. The horizontal deflector 14 and the vertical deflector mirror device 17 are controlled by drivers 15 and 18, respectively, which are adapted to the respective drive systems thereof. Sawtooth waveform control signals are input to the drivers 15 and 18. The respective sawtooth waveform control signals are produced by generators 16 and 19. The operation of the generators 16 and 19 is synchronized with horizontal synchronizing signals and vertical synchronizing signals generated by the video signal generator 10.

As mentioned in the above, color dispersion would be produced when an acousto-optical deflector is used for the optical deflection. If the above construction were used to perform deflection of the laser beam without correction, with respect to horizontal deflection performed using the acousto-optical deflector 14, the effect of the color dispersion would be that identically timed R, G and B laser beam component would reach the output medium OM at different points. This positional difference would be observed as chromatic shift.

In this embodiment, the color dispersion is corrected by the time-base adjustment of the corresponding modulating operation of the optical modulators 31, 32 and 33. The optical modulators 31, 32 and 33 are controlled by the processor 21 via respective drivers 34, 35 and 36.

The processor 21 drives the optical modulators 31, 32 and 33 on the basis of an RGB video signal output by the video signal source 10 (which may be a video camera, a telecine device or a VTR or the like) and is comprised, as described hereinbelow, of memory devices and a microprocessor device for the I/O control thereof.

Figure 2:
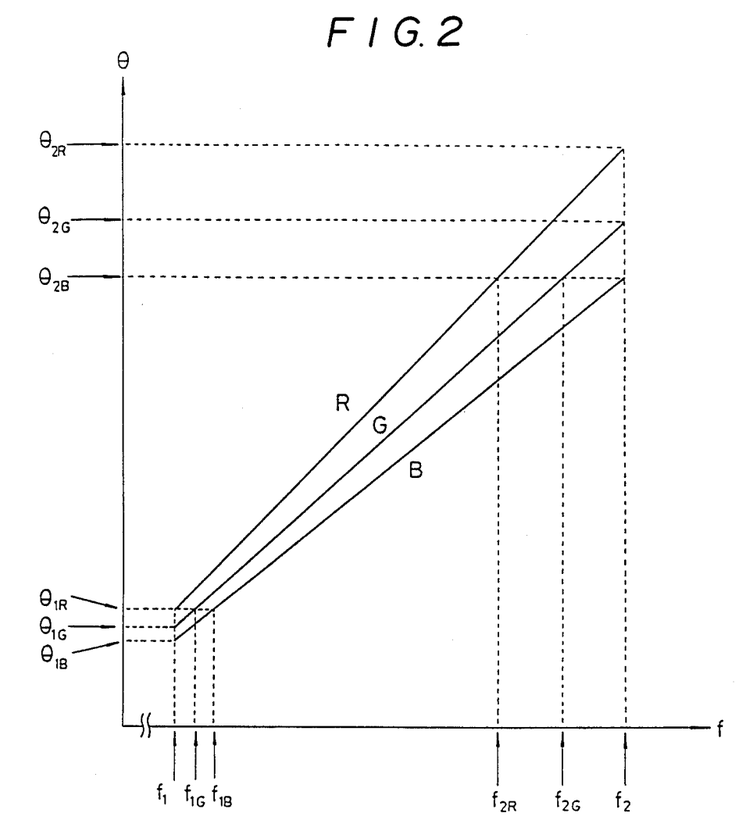
FIG. 2 is a graph showing the relationship between the ultrasonic drive frequencies of the acousto-optical deflector and the deflection angle for each of the RGB laser beam components.

To explain the compensation operation performed by the processor 21, FIG. 2 shows the dependency on the laser beam wavelength of the relationship between the drive frequency f of the acousto-optical deflector that performs the horizontal deflection and the deflection angle $\theta$. In the figure the horizontal axis shows the ultrasonic frequency f of a drive signal that drives the acousto-optical deflector, and the vertical axis shows the obtained angle $\theta$ of deflection.

If $\lambda_R$, $\lambda_G$ and $\lambda_B$ are the wavelengths of the RGB laser beams and v is the ultrasonic velocity, the angle $\theta$ of deflection will be:

$$\theta \cong \lambda f/v$$

providing the three straight lines for the three primary colors as shown in FIG. 2.

With respect to the ultrasonic frequency $f_1$ in FIG. 2, R, G, B deflection angles become $\theta_{1R}$, $\theta_{1G}$ and $\theta_{1B}$, respectively.

Regarding the higher-frequency part of frequency $f_2$, the respective R, G, B deflection angles become $\theta_{2R}$, $\theta_{2G}$ and $\theta_{2B}$. With respect to the lower-frequency part, if the R deflection angle obtained at a frequency of $f_1$ is regarded as $\theta_{1R}$, the frequencies at which the same deflection angle will be obtained for G and B will be $f_{1G}$ and $f_{1B}$, respectively.

If with respect to the higher-frequency part of frequency $f_2$ the B deflection angle is $\theta_{2B}$, the frequencies at which the same deflection angles will be obtained for R and G will be $f_{2R}$ and $f_{2G}$, respectively.

When the laser beams are each intensity-modulated by the optical modulators 31 to 33, the range of frequency utilized with respect to the R, G and B colors are $f_1 - f_{2R}$, $f_{1G} - f_{2G}$ and $f_{1B} - f_2$, respectively, which determine the same angular range of deflection $\theta_{2B} - \theta_{1R}$.

Figure 3:
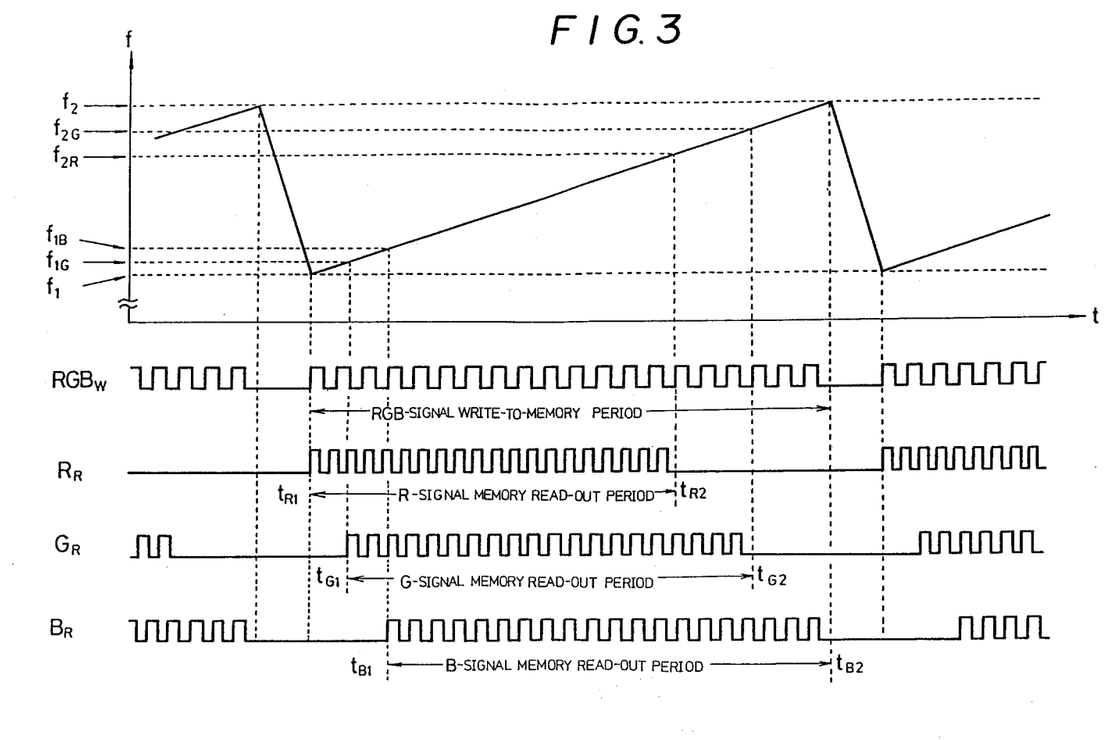
FIG. 3 is an explanatory view showing the color dispersion compensation principle, using memories.

FIG. 3 shows the horizontal scanning in the construction of FIG. 1, and signal processing by the processor 21. The graph in the upper part of FIG. 3 shows linear changes in variable frequency f in the acousto-optical deflector during the scanning of the medium. As stated above, the range of such change is set to within $f_1 - f_2$.

With this horizontal deflection, to enable the R, G and B intensity components of each composite picture or image element to be optically reproduced on the medium OM at the designated point, there can be utilized a timing control to equalize the deflection angle for each wavelength.

That is, according to an intensity bit data representative of the R intensity component of a particular picture element contained in the signal video for example, the R laser beam is modulated when the ultrasonic frequency is $f_1$, and from the example of FIG. 2, when the respective frequencies become $f_{1G}$ and $f_{1B}$, the G and B laser beams are modulated by the G intensity bit data and B component intensity bit data of the same picture element. Accordingly, it becomes possible for the correct R, G and B intensity components of the desired picture element contained in the video signal to be optically reproduced on the same spot on the output medium. Similarly, with respect to the upper limit frequency $f_2$, using the B laser beam component as the reference, if the G and R laser beam components are intensity-modulated when the respective frequencies are $f_{2G}$ and $f_{2R}$, it becomes possible for the correct R, G and B intensity bit data of the desired picture element contained in the video signal to be optically reproduced on the same spot on the output medium. Accordingly, in this embodiment, the RGB video signal output by the video signal source 10 is first stored in a memory provided in the processor 21 as a plurality of sets of R, G and B intensity bit data, and a set of the R, G and B bit data are then read out at different timings that provide the same deflection angle with respect to the R, G and B laser beam components for each picture element.

With reference to the RGB$_W$ waveform in FIG. 3, for each of the R, G and B laser beam components, input data from the video signal source is written to memory at the same time, as it is, within one horizontal scanning period. As for the read-out operation, with reference to the $R_R$, $G_R$ and $B_R$ waveforms of FIG. 3, the data written in as shown in RGB$_W$ is read out for each individual wavelength. The timing of the start of the read-out of the RGB intensity bit data, from the above conditions, is set at $t_{R1}$, $t_{G1}$ and $t_{B1}$ within a designated moment when the respective frequencies are $f_1$, $f_{1G}$ and $f_{1B}$. Similarly, completion of the read-out is set at $t_{R2}$, $t_{G2}$ and $t_{B2}$ within another designated moment when the frequencies are $f_{2R}$, $f_{2G}$ and $f_2$. Because the duration of the read-out period differs, a different memory read-out speed must be used for each of the R, G and B bit data.

In FIG. 3, for simplification, resolution per horizontal sweep period has been set at 20 bits, but if required a resolution value of 256 bits, 512 bits or 1024 bits per scanning line may be used, as desired.

Figure 4:
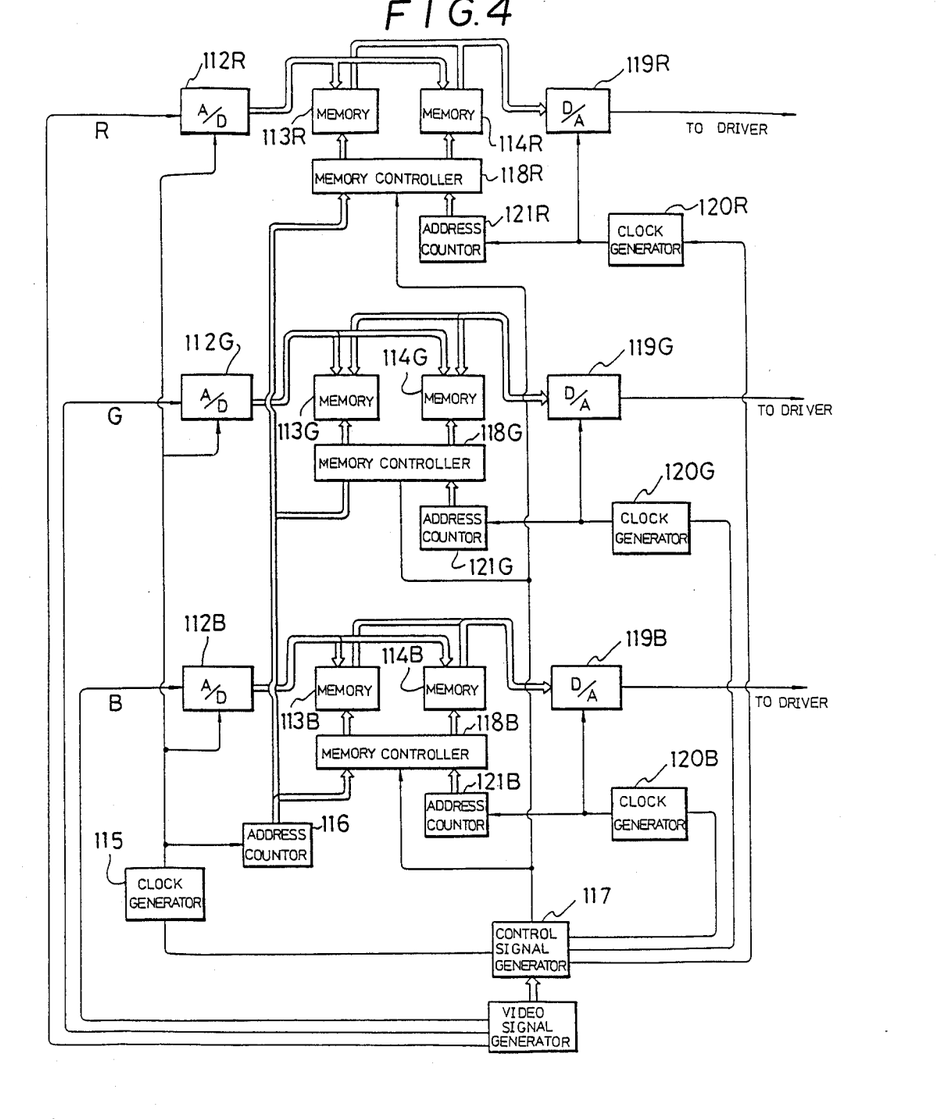
FIG. 4 is a block diagram showing the construction of the processing devices shown in FIG. 1.

FIG. 4 shows a specific construction of the processor 21 for performing the above control. Here, for the processing of the R, G, B outputs from the video signal source 10, circuit blocks of identical construction are provided for each of the R, G and B components. Each of the blocks is identically numbered and is differentiated by the use of the letters "R", "G" and "B." Hereinbelow the circuit blocks will be referred to by number only, except when otherwise necessary.

As shown in the drawing, the R, G, B video signals output by the video signal source 10 are amplified to the required level by an amplifier 111 and converted into digital data of the required number of bits by an A/D converter 112. The thus converted digital data is stored in a memory 113 or a memory 114.

The signal processor 21 processes the video signal components so that they are delayed, compressed or expanded on a time coordinate which varies for each wavelength.

Output from the memory 113 or memory 114 is converted back into analog data by a D/A converter 119 and is then output to the optical modulator drivers of the R, G and B laser beam components.

Selection of memory 113 or 114 when it is time to write data to memory is performed by a control signal generator 117. Specifically, the control signal generator 117 applies a signal via a memory controller 118 to select R, G and B component memory 113 or 114. At the same time, the address of the memory 113 or 114 to which the data is to be written is designated via a write operation clock generator 115 and an address counter 116. The transmitted R, G and B bit data is written to memory simultaneously as it is. For the address control, the same clock generator 115 is used for the R, G and B bit data.

As stated in the foregoing, read-out from the memory 113 or memory 114 must be performed at a speed and timing that differs for each frequency f. Therefore, for each of the R, G and B components, there are used corresponding independent address counters 121R, 121G and 121B, for read-out time address designation, and clock generators 120R, 120G and 120B, for the read-out of data. Each of the clock generators is controlled by the control signal generator 117 so as to achieve the control of the aforementioned modulation timing. This operation of the control signal generator 117 is performed in synchronization with the output of the video signal source 10.

The operation of the above construction will now be explained hereinbelow.

Figure 5:
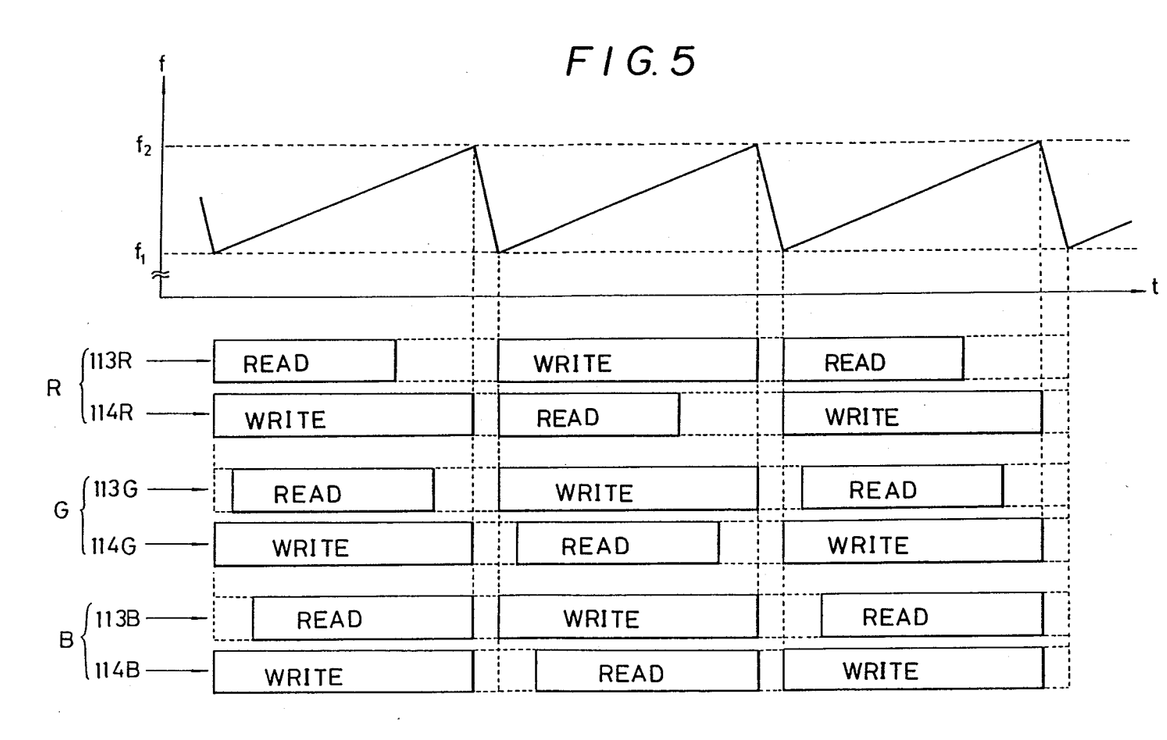
FIG. 5 is an explanatory diagram showing how the memory of FIG. 4 is allocated.

With reference to FIG. 5, which shows the allocation of the memories 113 and 114 to produce the write and read-out timing of FIG. 3, in a single scanning period, one memory, for example, memory 113 is used to write data and the other memory 114 is used for read-out of the data that was written in during the preceding scanning period. As explained with reference to FIG. 3, a different memory read-out period is set for each of the R, G and B components.

With the above construction, with each horizontal scanning period, the R, G and B component memories 113 and 114 each has stored therein video signal source horizontal scan data for each component. Also, as already stated in the foregoing, the memory read-out timing and read-out speed, meaning, with respect to the intensity-modulation means, the data input timing and input speed, are adjusted to equalize the deflection angles of the R, G and B beam components for the particular picture element. That is, with respect to the intensity-modulation means, the data input time-base is changed for each of the R, G and B components in accordance with the color dispersion thereof.

As described in the foregoing, by regulating the timing of data input to the modulation means, R, G and B laser beams correctly modulated according to the R, G and B intensity bit data of the desired picture element of the signal source can be beamed at the same spot on the output medium. Viewed microscopically, the R, G and B intensity bit data of a particular picture element of the signal source are not optically reproduced the output medium at exactly the same time, but because this time or the designated moment is very small, when viewed with the naked eye, and when the medium on which the image is projected is a screen photosensitive film, the difference presents no problem whatsoever.

In accordance with the above embodiment, high-speed horizontal scanning can be performed using acousto-optical deflectors, in addition to which the color dispersion which is a characteristic of such acousto-optical deflectors can be entirely eliminated, thereby also enabling the output processing of color images, such as moving pictures and the like, to be performed. Because also the horizontal scanning is carried out by acousto-optical deflectors which do not require high-precision mechanical control, stable horizontal scanning over a long period becomes possible. With respect to vertical deflection, relatively low-cost mirror devices are used, and fully adequate durability and precision for the deflection frequency can be assured.

Also, because with this embodiment the effects of color dispersion are corrected by a purely electronic construction, the cost is lower than the conventional optical correction systems, and accurate, stable correction is possible. Moreover, if it becomes necessary to change the wavelength of the scanning laser beams, it is very easy to perform this change.

Furthermore, the above construction can be used to remove not only the color dispersion that is unavoidably produced by acousto-optical deflectors; the effects of single-dimensional chromatic aberration generated by other optical systems or the like also may be eliminated, if the conditions under which generation occurs are known.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. A laser beam scanning system for use in scanning a medium in at least one direction to produce a color image thereon, comprising:
    laser source means for producing a plurality of laser beams each having a different wavelength;
    a video signal source for producing color video signals chromatically corresponding to the wavelengths of the laser beams;
    a plurality of intensity modulators each receptive of one of the laser beams and one of the color video signals for intensity-modulating the corresponding laser beam with the video signal;
    a signal source for producing a drive signal having a variable frequency which can be changed during one scanning time period;
    an acousto-optical deflector responsive to the variable frequency of the drive signal for deflecting the laser beams of different wavelengths simultaneously at an angle of scanning deflection which is dependent on the variable frequency and the wavelength of the laser beam, resulting in color dispersion at the output of the deflector; and
    a signal processor for processing the video signals from the video signal source in such a manner that the video signals are delayed, compressed or expanded based on a time coordinate which varies for each wavelength while the video signals are input at the same timing and output differently from each other in terms of scanning time, and these processed video signals are provided for the respective intensity modulators to thereby intensity-modulate the laser beams so that the influence of the color dispersion at the output of the acousto-optical deflector is compensated to output color images on the medium.

2. A laser beam scanning system as set forth in claim 1; wherein the signal processor includes means for electronically converting the video signals from the video signal source which could give rise to the influence of color dispersion due to the acousto-optical deflector on the medium into intensity-modulation signals which give rise to no influence of color dispersion on the medium on the real time basis.

3. A laser beam scanning system as set forth in claim 1; wherein the signal processor includes means for adjusting timings of the input and output of video signals to eliminate the influence of the color dispersion due to the acousto-optical deflector on the deflection angle of the laser beams so that the deflection angle corresponding to the time coordinate of one video signal coincides substantially with the deflection angle corresponding to the time coordinate of another video signal.

4. A laser beam scanning system as set forth in claim 1; wherein the signal processor includes an A/D converter, a D/A converter and a line-memory whose capacity corresponds to one scanning time period of the laser beam for each wavelength.

5. A laser beam scanning system as set forth in claim 4; wherein the A/D converter and a write control input terminal of the line-memory receive identical clock signals for each wavelength, while a read control input terminal of the line-memory and the D/A converter receive clock signals whose phases and frequencies vary for each wavelength.

6. A laser beam scanning system as set forth in claim 4; wherein the line-memory is composed of two memory devices which act complementally in one scanning time period of the laser beams.

7. A laser beam scanning system for use in scanning a medium in at least one direction to produce a color image thereon, comprising:
    laser source means for producing a plurality of laser beams each having a different wavelength;
    a video signal source for producing color video signals which chromatically correspond to the wavelengths of the laser beams;
    a plurality of intensity modulators each receptive of one of the laser beams and one of the color video signals for intensity-modulating the corresponding laser beam with the video signal;
    deflector means for deflecting the laser beams periodically and simultaneously for each wavelength at an angle of scanning deflection which is dependent on the wavelength of the laser beam according to the principle of optical diffraction or other optical wavelength dependent phenomenon, resulting in color dispersion at the output of the deflector means; and a signal processor for processing the video signals from the video signal source in such a manner that the video signals are delayed, compressed or expanded based on a time coordinate, the signal processor including an A/D converter, a memory device and a D/A converter which can be controlled by clock signals whose phases and frequencies are varied for each wavelength while the video signals are input at the same timing and output differently from each other in terms of scanning time so that these processed video signals are provided for the intensity modulators to thereby intensity-modulate the laser beams so that the influence of the color dispersion at the output of the deflector means is removed from output color images on the medium.

8. A laser beam scanning system as set forth in claim 7; wherein the deflector means comprises an acousto-optical deflector.

9. A laser beam scanning system as set forth in claim 7; wherein the signal processor includes means for electronically converting the video signals from the video signal source which could give rise to the influence of color dispersion due to the deflector means on the medium into intensity-modulation signals which give rise to no influence of color dispersion by each wavelength on the medium on the real time basis.

10. A laser beam scanning system as set forth in claim 7; wherein the signal processor includes means for adjusting a timing of the input and output of video signals to eliminate the influence of the color dispersion due to the deflector means on the deflection angle of the laser beams so that the deflection angle corresponding to the time coordinate of one video signal coincides substantially with the deflection angle corresponding to the time coordinate of another video signal.

11. A laser beam scanning system as set forth in claim 7; wherein identical clock signals for each wavelength are provided for the A/D converter and a write control input of the memory device, while clock signals whose phases and frequencies vary for each wavelength are provided for a read control input of the memory device and the D/A converter.

12. A laser beam scanning system as set forth in claim 7; wherein the memory device comprises a line-memory whose capacity corresponds to one scanning time period of the laser beams, the line-memory being composed of two memory sections which act complementally in one scanning time period.

13. In an apparatus for optically reproducing a composite color image element composed of different color tone components at a designated point on a given locus during a designated moment within one scanning period according to a video bit data composed of color data components corresponding to the respective color tone components: laser means for producing chromatic laser beams having color beam components corresponding to the different color tone components; modulating means operative during a designated moment for modulating the laser beams with a video bit data such that the respective color beam components are modulated with the corresponding color data components at different modulation timings within the designated moment; deflecting means operative during one scanning period and receptive of the modulated laser beams for angularly sweepingly deflecting the laser beams along the given locus to irradiate the designated point during the designated moment, the deflecting means having chromatic deflectivity so that the respective beam components are angularly deviated from each other during the sweeping deflection thereof to asynchronously irradiate the designated point at different irradiation timings within the designated moment; and controlling means for controlling the modulating means to synchronize the modulation timings with the irradiation timings to thereby enable the modulated color beam components to form the composite color image element at the designated point during the designated moment.

14. An apparatus according to claim 13; wherein the deflecting means comprises an acousto-optical deflector driven by a drive signal having a variable frequency for angularly sweepingly deflecting the laser beams in proportion to the variable frequency.

15. An apparatus according to claim 14; wherein the controlling means includes means operative during each scanning period for applying a drive signal having a linearly variable frequency to the acousto-optical deflector to deflect the laser beams.

16. An apparatus according to claim 13; wherein the controlling means includes memory means for storing a plurality of video bit data corresponding to a plurality of composite color image elements which are sequentially reproduced along the given locus during one scanning period.

17. An apparatus according to claim 16; wherein the controlling means includes designating means for designating a point of the locus and a moment of one scanning period for respective ones of the stored video bit data.

18. An apparatus according to claim 16; wherein the controlling means includes retrieving means for retrieving the color data components of one video bit data from the memory means at synchronized different timings to apply the retrieved color data components to the modulating means at the synchronized modulation timings.

19. An apparatus according to claim 18; wherein the retrieving means includes a D/A converter for converting retrieved digital color data components into corresponding analog color data components effective to modulate the respective color beam components.

20. An apparatus according to claim 16; wherein the controlling means includes an A/D converter for converting an analog video signal into a plurality of digital video bit data to thereby sequentially load the same on the memory means.

* * * * *